(12) United States Patent
Hawver et al.

(10) Patent No.: US 9,367,974 B1
(45) Date of Patent: Jun. 14, 2016

(54) SYSTEMS AND METHODS FOR IMPLEMENTING NETWORK CONNECTIVITY AWARENESS, MONITORING AND NOTIFICATION IN DISTRIBUTED ACCESS CONTROL

(71) Applicant: ROCKWELL COLLINS, INC., Cedar Rapids, IA (US)

(72) Inventors: Kyle Hawver, Middle River, MD (US); Tyler Harper, Denton, MD (US); Tim Ryan, Pasadena, MD (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 313 days.

(21) Appl. No.: 14/247,198

(22) Filed: Apr. 7, 2014

(51) Int. Cl.
    *G05B 19/00* (2006.01)
    *G07C 9/00* (2006.01)
(52) U.S. Cl.
    CPC .................... *G07C 9/00007* (2013.01)
(58) Field of Classification Search
    None
    See application file for complete search history.

(56) References Cited

U.S. PATENT DOCUMENTS

| | | | |
|---|---|---|---|
| 5,377,196 A | 12/1994 | Godlow et al. | |
| 7,237,023 B2 | 6/2007 | Menard et al. | |
| 7,882,394 B2 | 2/2011 | Hosek et al. | |
| 8,179,227 B2* | 5/2012 | Dziadosz | G07C 9/00007 340/5.1 |
| 8,356,207 B2 | 1/2013 | Hosek et al. | |
| 8,514,827 B2 | 8/2013 | Matta et al. | |
| 2006/0048233 A1* | 3/2006 | Buttross | G07C 9/00023 726/27 |
| 2006/0214767 A1* | 9/2006 | Carrieri | G07C 9/00158 340/5.61 |
| 2007/0188303 A1* | 8/2007 | Faro | G07C 9/00103 340/5.73 |
| 2007/0200665 A1* | 8/2007 | Studerus | G07C 1/10 340/5.61 |
| 2009/0119762 A1* | 5/2009 | Thomson | G07C 9/00031 726/7 |
| 2009/0298484 A1* | 12/2009 | White | H04H 20/24 455/414.3 |
| 2010/0192075 A1* | 7/2010 | Black | H04L 12/4641 715/764 |
| 2012/0068816 A1* | 3/2012 | Crawford | G07C 9/00817 340/5.25 |
| 2012/0140705 A1* | 6/2012 | Matta | H04W 48/12 370/315 |
| 2014/0129172 A1* | 5/2014 | Eberhardt | G01N 1/28 702/108 |
| 2015/0221152 A1* | 8/2015 | Andersen | G07C 9/00309 340/5.22 |

\* cited by examiner

*Primary Examiner* — Ojiako Nwugo
(74) *Attorney, Agent, or Firm* — Ronald E. Prass, Jr.; Prass LLP (57) ABSTRACT

A system and method are provided for monitoring and aggregating performance of a plurality of independently-controlled access points and connections to a plurality of independently-owned access databases for confirming access to one or more of an access-controlled space, one or more access-controlled pieces of equipment and/or one or more access-controlled devices. A scheme is provided by which disconnections between a central coordination facility, and one or more of the remote databases may be isolated. The central coordination facility is provided a capacity to identify an outage in its communication to a particular database and (1) to determine a cause for the outage through coordination with the entity overseeing the database, (2) to evaluate any need for technical interaction of the central coordination facility, and/or (3) to initiate a notification protocol for end-users attempting to gain/grant access to a particular space, piece of equipment or device.

20 Claims, 3 Drawing Sheets

SYSTEMS AND METHODS FOR IMPLEMENTING NETWORK CONNECTIVITY AWARENESS, MONITORING AND NOTIFICATION IN DISTRIBUTED ACCESS CONTROL

BACKGROUND

1. Field of the Disclosed Embodiments

This disclosure relates to systems and methods for monitoring and aggregating performance of a plurality of independently-controlled access points and connections to a plurality of independently-owned access databases for confirming access to one or more of an access-controlled space, one or more access-controlled pieces of equipment and/or one or more access-controlled devices.

2. Related Art

World events have led to ever increasing vigilance in controlling access to spaces, equipment and/or access-controlled devices. This increased vigilance has led to large numbers of increasingly-sophisticated clearance procedures for authorizing such access. Some of these clearance procedures are locally implemented using in-house databases for providing individual access to one or more of a particular space, a particular piece of equipment, or a particular device. Increasingly, however, there is a need to share individual entity controlled databases to grant access to non-locally controlled spaces, equipment or devices. There are certain circumstances in which a more global access needs to be provided to a particular space, piece of equipment or device. In these circumstances, one entity may have immediate physical control over the particular space, piece of equipment or device, but individuals from one or more related entities may seek to be granted access, or control access by another, to the particular space piece of equipment or device.

Earlier security paradigms required that the one entity having immediate physical control over the particular space, piece of equipment or device would require that the other entities whose individuals desire to be granted access would provide clearance information to the controlling entity. In certain scenarios, this paradigm has become increasingly unworkable.

There are those who believe that there is no more pressing example of the requirement for enhanced vigilance than with respect to access to mass transportation and/or transit, particularly including access to airline transportation. As the requirements for vigilance in this regard have significantly increased in the years since the 9/11 attacks in the United States, a traveler knows that security checkpoints at airports have become increasingly sophisticated. Unfortunately, this sophistication, combined with legislated and/or administratively imposed security procedures, has led to tremendous bottlenecks at the security checkpoints. Additionally, this is precisely the type of scenario that does not lend itself to a controlling entity, for example an individual airport authority, collecting clearance data on all individual desiring to gain access to flights.

Here, against a heightened security backdrop balanced with some desire to reduce the level of inconvenience, and the frustration that is attendant in that inconvenience, increasing attention has been paid to involving an external clearinghouse in a process for pre-clearing certain individuals. Frequent travelers submit to limited background checks enabling them to gain priority clearance through, for example, the CLEAR® system. Available advertising for the system promises to allow individuals, once pre-registered, to clear security in less than five minutes. For registered individuals, access is provided to exclusive "CLEARlanes" at airport security checkpoints, generally allowing those individuals to skip the extensive security lines and to proceed straight to the security screening checkpoints. Nonetheless, once these individuals arrive at the security checkpoint, even having bypassed the lines, they remain subject to standard screening procedures.

Even the screening procedures, however, tend to be cumbersome for individuals including airline personnel and employees. All efforts have been made to accelerate procedures for these individuals. These efforts may provide a model for central clearing house controlled dispersed access to spaces, equipment and/or devices.

SUMMARY OF THE DISCLOSED SUBJECT MATTER

The example implementation discussed in the following paragraphs will help frame the basis for the disclosed embodiments, but is not intended to limit the disclosed schemes to just this single scenario. Airline crew members often benefit from a limited convenience of accelerated screening through airport security systems based on presenting multiple identifications, which are presented in a standard and easily recognizable form, to screening personnel. The fact that the airline crew members are carrying the multiple forms of standard and easily-recognizable identification provides a certain confidence to the screening personnel that the airline crew members are pre-cleared by the airlines for which they work. This confidence alone, however, is not enough to dispense with all screening procedures. The airline crew members are allowed to bypass the security lines, but they conventionally still received a security screening albeit that it may be abbreviated or expedited.

Even this accelerated security screening was, however, considered by many to be overly intrusive and disruptive to the general screening activities. Airline crew members consider that a necessity for any screening of their persons or packages whatsoever is unwarranted based on their position as airline crew members. The position of many airline crew members is that the airlines have completely pre-screened them based on extensive background checks and the like, which are often exhaustively routinely updated. As such, it is a broad consensus among many airline crew members that they should be afforded the opportunity to simply "flash their badge" and bypass the security screening altogether.

In an effort to address airline crew member sensitivities and concerns in this regard, while maintaining some level of clearance oversight, particular systems have been developed that generally provide an opportunity for crew members to present themselves to a security representative at a separate "private" security checkpoint that does not include the standard inconvenient and/or intrusive screening mechanisms and processes. A generally accepted industry standard screening acceleration system is the ARINC® proprietary CrewPASS[SM] airport screening and identification verification service that has been largely adopted industry wide under the trade name "Known Crewmember." This service provides network connected workstations in the form of local communication terminals at each of the separate security checkpoints at dozens of airports throughout the United States. The service connects these workstations via a central coordination facility to dozens of airline-controlled employee databases.

An interaction between an airline crew member and the security representative at the separate security checkpoint involves the airline crew member presenting his or her airline-provided credentials, along with a separate government-issued picture ID to the security representative. The security representative then enters the crewmember's airline and employee identification number into the communication terminal to be transmitted in real-time to the central coordination facility. As implemented, the central coordination facility provides a communication hub/interface between the many security representatives at the many separate security checkpoints with the many airline-controlled employee databases proprietarily held and controlled by the airlines themselves. Upon receiving a clearance request from a particular security representative at a particular separate security checkpoint, the central coordination facility queries the particular airline's database for real-time confirmation of the current status for the airline crew member that is the subject of the clearance request.

As implemented, the central coordination facility confirms with the airline an employment status of the airline crew member and/or authorization for the airline crew member to participate in the separate security screening process and to be granted access to airline equipment. Once the airline confirmation is received, the central coordination facility, as currently implemented, returns a digital photograph of the airline crew member from the airline's database along with additionally-stored identifying information directly to the service representative's communication terminal for comparison of the photo, the name and the other information with the credentials presented by the airline crew member. With the information confirmed, the security representative allows the airline crew member to pass without being further encumbered. In the current implementation, the entire process generally takes less than thirty seconds to complete the end-to-end communication and return the airline crew-member verifying information to the security representative.

Based on an ability of such a system to provide real-time airline-attested personnel verification, any inconvenience to, or intrusion of, the airline crew members is generally minimized without sacrificing some reasonable form of security implementation even for these individuals. Over time, it has been determined that the connectivity to the individual airline databases is the most vulnerable link in the system, i.e., the most susceptible portion of the system to outages. When such an outage occurs, it can take considerable time to identify the outage and/or to diagnose the reason for the outage, and then to notify all of the participating nodes regarding the outage.

More generally, instances may occur when the information exchange between the central coordination facility and a particular employee database, including an airline database, is interrupted or non-responsive. Particular instances in which this may occur include circumstances in which a connection to a particular airline goes down. When the airline system is down, interrupted, or not responding for some reason, the central coordination facility is unable to provide timely, if any, response to the communication terminal of the particular security representative other than a denial of access for the individual airline crew member requesting such access. In the current scenario, the airline crew member is then directed to standard security screening leading to inconvenience and frustration. Such situations will necessarily create undesirable congestion at the particular separate security checkpoint where an unverifiable airline crew member presents himself or herself for clearance. These situations will also lead to confusion and uncertainty regarding whether the unverifiable airline crew member is indeed unauthorized, or whether the inability to verify the credentials of the airline crew member may be based on a system problem including, but not limited to, the inability of central coordination facility to contact the crew member's airline to complete the verification. This can ultimately lead to discomfort and commotion at the separate security checkpoint.

In order to address the above circumstances, separate direct communication is generally undertaken between those responsible for the particular separate security checkpoint having the difficulty and the central coordination facility to ascertain a cause for the current difficulty and to initiate remedial actions.

In view of the above circumstances, it may be advantageous to provide a scheme by which disconnections between the central coordination facility, and one or more of the remote databases may be isolated in order to initiate a notification scheme, and the taking of remedial actions to correct the difficulties.

Exemplary embodiments of the disclosed systems and methods may provide a scheme whereby the central coordination facility may identify an outage in its communication to a particular database and (1) determine a cause for the outage through coordination with the entity overseeing the database, (2) evaluate any need for technical interaction of the central coordination facility, and/or (3) initiate a notification protocol for end-users attempting to gain/grant access to a particular space, piece of equipment or device.

Exemplary embodiments may access information available to the central coordination facility in its communication with huge numbers of widely-dispersed separate "special" security checkpoints in real-time. The disclosed schemes may monitor the central coordination facility as the first to be alerted to an interruption in communication with a particular database. Returning to the example airline scenario, it is the central coordination facility that may first observe that airline crew members for Airline X are being rejected in a particular timeframe at the separate security checkpoints in Los Angeles, Chicago, Nashville, Dallas and Miami, to name a few. Such a pattern of rejections of individual airline crew members from Airline X may not be otherwise observable except via the central coordination facility.

Exemplary embodiments may provide an analysis of pre-determined number of "rejects" from a particular database that lead to a conclusion that communication between the central coordination facility and that database may have been interrupted.

Exemplary embodiments may trigger a series of diagnostics to determine whether a pre-determined number of rejects are somehow anomalous, or communication with a particular database has, in fact, been broken. In a latter instance, a series of immediate actions particularly directed at re-establishing communication with that particular database may be undertaken. Separately, in such circumstances, the central coordination facility may send alert messages to end-users to alert those end-users as to the situation. In the airport separate security checkpoint scenario, these alerts may timely result in the security representatives at separate security checkpoints not wasting their time dealing with checking the credentials of crew members of the particular air carrier with which the central coordination facility has lost communication.

These and other features and advantages of the disclosed systems and methods are described in, or apparent from, the following detailed description of various exemplary embodiments.

BRIEF DESCRIPTION OF THE DRAWINGS

Various exemplary embodiments of the disclosed systems and methods for monitoring and aggregating performance of a plurality of independently-controlled access points and connections to a plurality of independently-owned access databases for confirming access of one or more to an access-controlled space, one or more access-controlled pieces of equipment and/or one or more access-controlled devices, will be described, in detail, with reference to the following drawings, in which.

DESCRIPTION OF THE DISCLOSED EMBODIMENTS

The disclosed systems and methods for monitoring and aggregating performance of a plurality of independently-controlled access points and connections to a plurality of independently-owned access databases for confirming access to one or more of an access-controlled space, access-controlled equipment and/or one or more access-controlled devices, will generally refer to this specific utility for those systems and methods. Exemplary embodiments will be described in this disclosure as being particularly adaptable to use in an advanced airline crew member security clearing procedure undertaken in a streamlined fashion at separate security checkpoints according to the routine described above. These descriptions should not be interpreted as specifically limiting the disclosed schemes to any particular configuration of a system for the grant of individual access. In fact, the systems and methods according to this disclosure may be equally applicable to any person-in-the-loop or automated security procedures for gaining access to controlled spaces, pieces of equipment and devices. Any ability to augment a central coordination facility, or central clearing house, with an appropriate scheme for more efficiently determining whether a communication link with at least one clearance database has been interrupted, more immediately initiating remedial actions and communications, and more expeditiously notifying access control points of the interruption is contemplated as being covered by this disclosure.

Specific reference to, for example, the above-discussed scenario for clearance of individual airline crew members at separate security checkpoints in airports as providing a particular example of where the systems and methods according to this disclosure may be particularly advantageously employed should be understood as being exemplary only, and not limiting the disclosed schemes, in any manner, to any particular class of access control units or processes, or to any particular communication link or protocol for implementing the disclosed schemes.

Features and advantages of the disclosed embodiments will be set forth in the description which follows, and in part will be obvious from the description, or may be learned by practice of the disclosed embodiments. The features and advantages of the disclosed embodiments may be realized and obtained by means of the instruments and combinations of features particularly pointed out in the appended claims.

Various embodiments of the disclosed embodiments are discussed in detail below. While specific implementations are discussed, it should be understood that this is done for illustration purposes only. A person skilled in the relevant art will recognize that other components and configurations may be used without departing from the spirit and scope of the disclosed embodiments.

The disclosed schemes may continually monitor and aggregate a performance of all access control points reporting to a particular central coordination facility, even in instances where the access control points are widely geographically dispersed. The disclosed schemes may provide a mechanism by which to diagnose a particular problem in connectivity between the central coordination facility and one of a plurality of dispersed, locally-controlled databases by which to confirm access permissions via the central coordination facility. This diagnosis is facilitated by an ability of the central coordination facility to collect data from multiple ones of the geographically-dispersed access control points and to determine trends by which accesses are rejected.

Monitoring of the geographically-dispersed access control points provides the opportunity for the central coordination facility to determine that an anomaly exists. In such circumstances, an initial response directed according to the disclosed schemes may be to perform a pre-determined diagnostic scheme. When an initial alert is verified according to the pre-determined diagnostic scheme, notifications may be sent to the on-call technical representatives overseeing the central coordination facility and the on-call technical representatives associated with the entity controlling the non-responding database. Additional notifications may be sent, as appropriate, to affected security access points to alert individual users, or security representatives at each of the individual security access points regarding a potential problem with a particular database's connectivity. The disclosed systems may continue to monitor the connectivity issues until circumstances surrounding the broken connectivity are verified and/or addressed.

Scheduled updates may be provided to the individual security access points regarding an ongoing status of the connectivity until such time as the connectivity is restored or, for example, a reason for an intentional disconnection initiated by the database overseer is confirmed. The ability of the central coordination facility to widely disperse updates to relevant access points is a particular benefit of the disclosed schemes.

As indicated above, diagnostic messages may be sent to technical, engineering or service personnel associated with the central coordination facility to determine whether the difficulty is internal to the central coordination facility, isolated to a particular connection to a single database, or is more widespread. Directed communication may be undertaken with the entities controlling affected database(s) to, at least, alert the entities as to the difficulty, remedial steps that are taken to address the difficulty and to the realistic possibility that individual personnel requesting access may be separately contacting the entities controlling the database(s) based on their rejection of access for reasons that they do not understand.

An automated scheme to identify such an interruption service may aid in reducing inconvenience throughout the system associated with a particular communication connectivity interrupt and may facilitate more rapid restoration of the service once the problem is isolated.

It should be recognized that there are circumstances in which an entity overseeing a particular database, including an airline, may choose to purposefully interrupt the connectivity to the central coordination facility based on real-time operational issues. An example of this may be where a particular airline determines that there is some immediate issue involving incorrect information in its database, or intrusion into its database, that can only be addressed through temporary suspension of access of all of its personnel to its equipment, or at least individual heightened scrutiny of the personnel prior to being granted access. It should also be understood that the entity overseeing the particular database may not want to share details of the difficulty. In such circumstances, preferably in coordination with the entity overseeing the particular database, the central coordination facility may continue to provide alerts to end-user access units at least alerting them to an ongoing difficulty in communicating with the database.

In a course of addressing a particular difficulty, it may be determined generally that the difficulty is on the side of the entity controlling the database, and certainly it is the entity controlling the database that has the greatest vested interest in not inconveniencing its people and otherwise disrupting its service to those people. As such, an ability to quickly identify the difficulty based on widely disparate individual inputs from a number of otherwise unconnected nodes may aid in most rapid restoration of the service specifically to the benefit of the entity controlling the database.

An ability to quickly inform security representatives at widely diverse security access points, including separate security checkpoints in multiple airports, may assist in reducing bottlenecks, eliminating confusion, and generally streamlining the security processes by which individuals may be ushered through the system.

Those of skill in the art will recognize that the disclosed schemes may be applicable to access to other transportation modalities including rail transit and/or cruise ships, as examples. The disclosed schemes may also be applicable to access to secure spaces that are intended to be accessed by individuals from many and widely disparate entities including, for example, law enforcement entities or separately-secured and screened entities. Further, the disclosed schemes may be applicable to, for example, access to restricted equipment owned by particularly and/or leased to specific end-users.

The disclosed schemes may specifically include components to perform the following functions: (1) monitoring and examination of the viability of applications running over a particular network in real-time; (2) aggregation of real-time performance data to compare against a knowledge-based set of characteristics and thresholds for operation of the system overall; (3) monitoring of the performance of an application across a wide area network to determine if an identified fault may be a false alarm; (4) procedures by which to implement corrective actions and/or to automatically clear non-verifiable alerts; (5) delivery of notifications/alerts to stakeholders based on a verifiable alert regarding a degradation in system performance; (6) delivery of ongoing updates to stakeholders across a wide area network as to a status of connectivity issues and processes undertaken to address those issues; and (7) delivery of information about the performance issues of any application to the appropriate stakeholders based on the nature of the performance problem using a particularly-defined set of notification rules and reference to a particular knowledge base.

Figure 1:
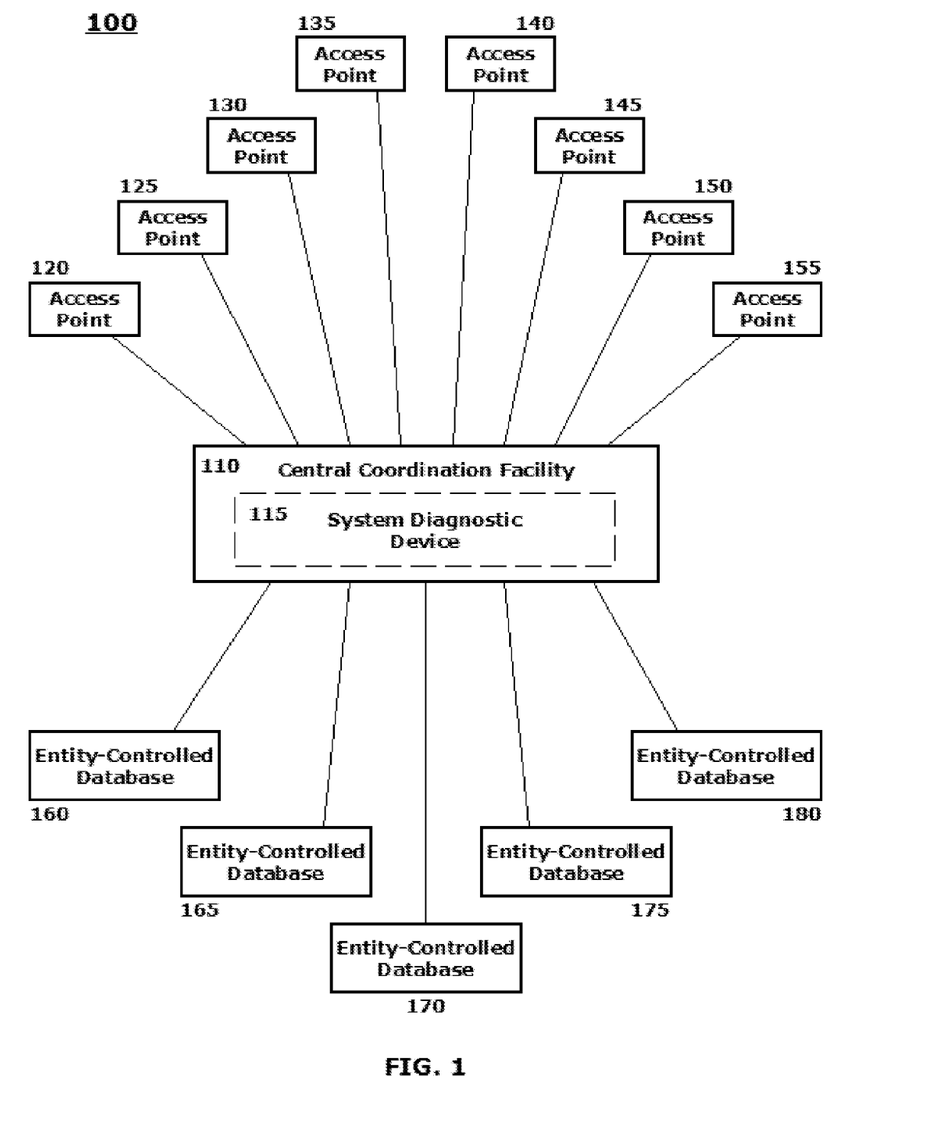
FIG. 1 illustrates an exemplary overview of an operating environment in which network connectivity awareness, monitoring and notification schemes may be implemented according to this disclosure.

FIG. 1 illustrates an exemplary overview of an operating environment 100 in which network connectivity awareness, monitoring and notification schemes may be implemented according to this disclosure. As shown in FIG. 1, the exemplary operating environment 100 involves myriad lines of communication (wired or wireless) between a central coordination facility, acting as the central clearing house, and a number of widely dispersed nodes.

The widely dispersed nodes may include a plurality of access points 120-155, which may be broadly geographically dispersed for providing access, at some level of an access control threshold, to one or more access-controlled spaces, one or more access-controlled pieces of equipment and/or one or more access-controlled devices. The widely dispersed nodes also include a plurality of entity-controlled databases 160-180. These databases may include company controlled employee registers, or other individual registration lists, by which the entity controlling the particular database may provide information regarding employee or other individual access authorizations upon request. A premise behind the disclosed access control schemes is that no single entity can appropriately collect and hold the individual verification data as tightly as an originating entity, or authorizing entity, that has a vested interest in most tightly controlling its own access verification information. The originating entities are, however, advantageously aided by an intervening clearing house structure that receives the access requests and accesses the various databases to fulfill the access requests.

The central coordination facility 110 may have associated with it, as an integral component, or as a separate connected component, a system diagnostic device 115. Such a system diagnostic device 115, as will be discussed in greater detail below, may be used to implement a network connectivity awareness scheme, including monitoring and notification.

In a normal course of operation, individuals will present themselves at any one of the individual access points 120-155 to request access to any one of a controlled space, controlled piece of equipment, controlled device or the like with which the individual access points 120-155 are associated. The individual access request will be forwarded to the central coordination facility 110, and include identification of the individual and identification of which of a plurality of entity-controlled databases 160-180 may hold the individual's access authorizations. The central coordination facility 110 then queries the identified one of the plurality of entity-controlled databases 160-180 to obtain the individual's access authorization for the particular space, piece of equipment or device with which the access point 120-155 at which the individual presented himself or herself is associated. With a verification of the individual's access authorization for the particular space, piece of equipment or device, the central coordination facility 110 will forward appropriate access authorization information to the appropriate access point 120-155 and the individual will be granted access.

In a circumstance where the central coordination facility 110 is unable to obtain the individual's access authorization for the particular space, piece of equipment or device, the central coordination facility 110 will forward appropriate information to the access point denying the individual's access. In each instance that a denial of an individual's access is determined and transmitted by the central coordination facility 110, the system diagnostic device 115 may record such an occurrence. The system diagnostic device 115 may then track trends of an inability to obtain individual access authorizations from a particular one of the entity-controlled databases 160-180. The system diagnostic device 115 may evaluate a pre-determined number of "denials" with regard to a particular one of the entity-controlled databases 160-180 and initiate a diagnostic inquiry to determine, for example, whether there is a problem in communication and/or connectivity with the particular one of the entity-controlled databases 160-180, including an interruption of communication with the particular database. When some manner of service interruption between the central coordination facility 110 and one or more of the entity-controlled databases 160-180 is detected by the system diagnostic device 115, a series of remedial, diagnostic and/or notification procedures may be implemented by the system diagnostic device 115.

Figure 2:
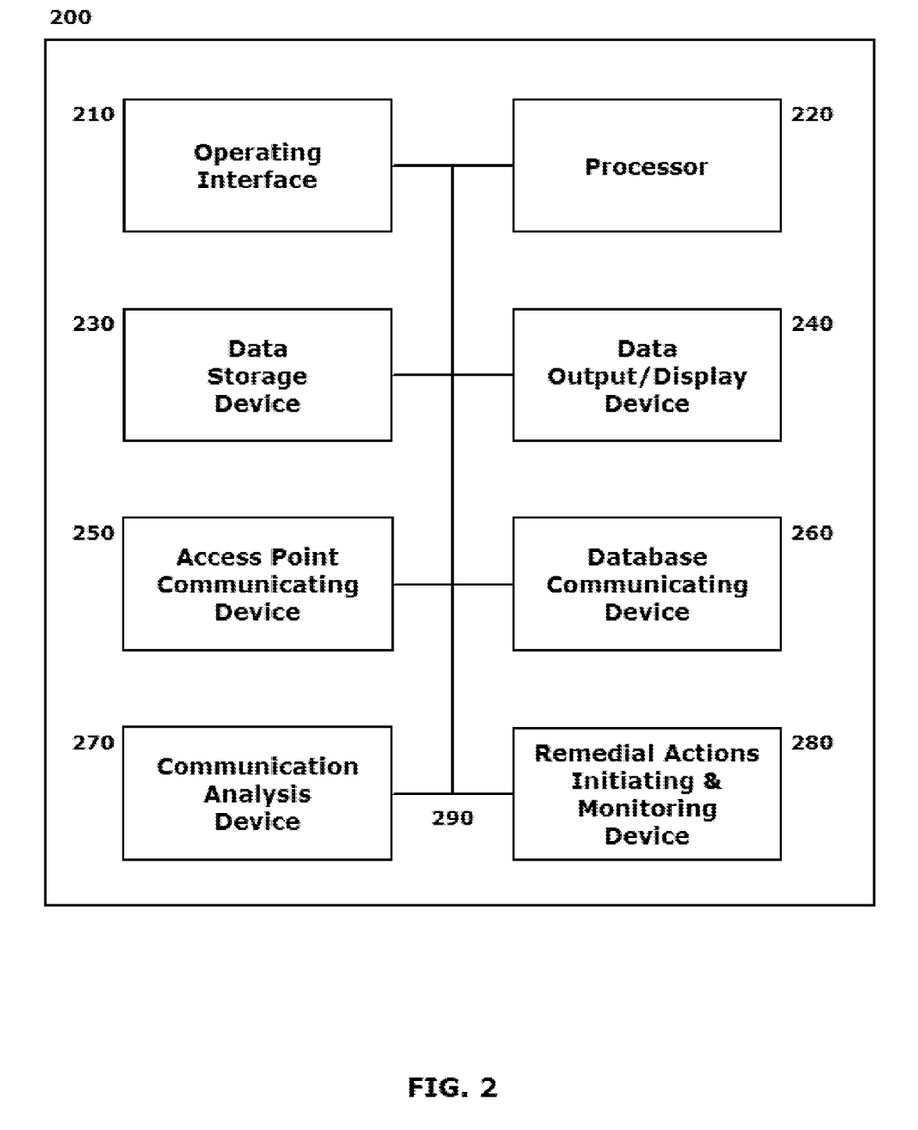
FIG. 2 illustrates an exemplary system diagnostic device for implementing network connectivity awareness, monitoring and notification according to this disclosure.

FIG. 2 illustrates an exemplary system diagnostic device 200 for implementing network connectivity awareness, monitoring and notification according to this disclosure. The exemplary system diagnostic device 200 shown in FIG. 2 may be implemented as a unit in the central coordination facility (element 110 in FIG. 1), or may be implemented as a combination of system components associated with the central coordination facility, including cloud-based processing and data storage components.

The exemplary system diagnostic device 200 may include an operating interface 210 by which a user may communicate with the exemplary system diagnostic device 200 for directing at least a mode of operation of the exemplary system diagnostic device 200 in implementing its connectivity awareness monitoring and remedial action and notification functions. Control inputs received in the exemplary system diagnostic device 200 via the operating interface 210 may be processed and communicated to any one of the many connected nodes in communication with the central coordination facility, including a plurality of access point control units and a plurality of individual entity-controlled access authorization databases. The operating interface 210 may be a part or a function of a graphical user interface (GUI) mounted on, integral to, or associated with, the exemplary system diagnostic device 200. The operating interface 210 may alternatively take the form of any commonly user-interactive device by which a user input and/or command are input to an automated processing system including, but not limited to, a keyboard or a touchscreen, a mouse or other pointing device, a microphone for providing verbal commands, or any other commonly-known operating interface device.

The exemplary system diagnostic device 200 may include one or more local processors 220 for carrying out the individual operations and functions of the exemplary system diagnostic device 200. The processor 220 may reference, for example, each access request and each response to an access request to monitor overall system stability and to keep to a minimum the issuance of false "denials" of access based on no information being received in response to a query to a particular external entity-controlled database, i.e., no response at all. The processor 220 may initiate an internal diagnostic scheme once a pre-determined number of "no responses" are received in the central coordination facility to inquiries to a particular one of the external entity-controlled databases.

The exemplary system diagnostic device 200 may include one or more data storage devices 230. Such data storage device(s) 230 may be used to store data or operating programs to be used by the exemplary system diagnostic device 200, and specifically the processor(s) 220 in carrying into effect the disclosed operations and functions. Data storage device(s) 230 may be used to store information regarding each access request and each response to an access request in order that the processor 220 in the exemplary system diagnostic device 200 may assess particular trends in communication with one or more of the external entity-controlled databases with which the central coordination facility communicates.

The data storage device(s) 230 may include a random access memory (RAM) or another type of dynamic storage device that is capable of storing updatable database information, and for separately storing instructions for execution of system operations by, for example, processor(s) 220. Data storage device(s) 230 may also include a read-only memory (ROM), which may include a conventional ROM device or another type of static storage device that stores static information and instructions for processor(s) 220. Further, the data storage device(s) 230 may be integral to the exemplary system diagnostic device 200, or may be provided external to, and in wired or wireless communication with, the exemplary system diagnostic device 200, including cloud-based storage and/or processing elements.

The exemplary system diagnostic device 200 may include at least one data output/display device 240, which may be configured as one or more conventional mechanisms that output information to a user, including, but not limited to, a display screen on a GUI associated with the exemplary system diagnostic device 200 to provide feedback to local technical personnel regarding the detection and/or confirmation of existence of an anomalous condition and an initiation of any remedial actions based on the detection and/or confirmation. The data output/display device 240 may be used to indicate to local technical personnel any information that may be usable by those local technical personnel in assisting in manually remediating the detected and/or confirmed anomalous condition. The information may include, for example, a requirement for the local technical personnel to contact the entity controlling the particular database that is the source of the anomalous condition to attempt to re-establish communication with the database, or to confirm conditions regarding the loss of connectivity with the database.

The exemplary system diagnostic device 200 may include at least one external data communication interface 250 by which the exemplary system diagnostic device 200 may communicate with external systems for effecting the network connectivity awareness, monitoring and notification schemes according to this disclosure. Specifically, in circumstances where the exemplary system diagnostic device 200 is not an integral component of the clearance systems in the central coordination facility, the exemplary system diagnostic device 200 may communicate with those clearance systems, for example, for recording access requests and responses to access requests via those clearance systems, through a particularly configured at least one external data communication interface 250.

The exemplary system diagnostic device 200 may include its own database communicating device 260, which may be used, for example, to attempt separate communications with a particular one of the entity-controlled databases when an assessment is made that a pre-determined number of access requests have resulted in denials based on a failure to acquire verification information from the particular one of the entity-controlled databases. In such a circumstance, it may be appropriate that a protocol by which the exemplary system diagnostic device 200 can quickly separately contact the particular entity-controlled database to determine whether verification information may exist for one or more of the individuals whose access was denied.

The exemplary system diagnostic device 200 may include a communication analysis device 270. The communication analysis device 270 may be a function of the processor 220 in communication with the data storage device 230, or may be a stand-alone device or unit within the exemplary system diagnostic device 200. The communication analysis device 270 may be the component that assesses the communications established between the central coordination facility and each of the individual entity-controlled databases to determine whether an anomalous condition of a higher than average number of access denials may be indicative of a communication interruption with one or more of the individual entity-controlled databases. In embodiments, the communication analysis device 270 may be alerted in each instance, within a particular timeframe, of a denial of access for an individual.

The communication analysis device 270 may associate the denials with the individual entity-controlled databases to which the queries regarding access were directed. Once a pre-determined number of denials are associated with a particular one of the individual entity-controlled databases within the particular timeframe, the communication analysis device 270 may assess that the error is not based on an anomaly, but is rather based on the communication interruption with the particular one of the individual entity-controlled databases. The communication analysis device 270, having made an initial determination regarding communication interruption, may then send a signal to other components within the exemplary system diagnostic device 200 to initiate one or more remedial actions.

The exemplary system diagnostic device 200 may include a remedial actions initiating and monitoring device 280. The remedial actions initiating and monitoring device 280 may be a function of the processor 220 in communication with the data storage device 230, or may be a stand-alone device or unit within the exemplary system diagnostic device 200. When a standalone device or unit within the exemplary system diagnostic device 200, the remedial actions initiating and monitoring device 280 may itself reference information from other components, including but not limited to the database communicating device 260 and/or the communication analysis device 270, to determine whether and what remedial actions may be appropriate given that a communication interruption with one or more of the entity-controlled databases has occurred.

Among the remedial actions that may be initiated and then monitored by the remedial actions initiating and monitoring device 280 are the following. Technical personnel within the central coordination facility may be alerted via one or more communication means to initiate certain manual procedures in an attempt to re-establish communication, and/or to ascertain at least a reason for the communication interruption. Alternate communication paths to the particular database may be set up. Communication with the entity controlling the particular database may be established to facilitate interaction, explanation, or restoration of the service. Communication with the access control points may be initiated to provide an indication as to the status of communication with one or more of the entity-controlled databases. Reports of actions taken by the remedial actions initiating and monitoring device 280 may be collected and stored in the data storage device 230 for later review and analysis. The above represents a list of just some of the remedial actions that may be initiated and monitored by the remedial actions initiating and monitoring device 280. The above list is not meant to be exhaustive, or all-inclusive, as other like actions that may aid in (1) establishing a reason for the connectivity interruption, (2) re-establishing connectivity, and (3) informing all, or at least some, of the communicating nodes, users, stakeholders or user entities are intended to be encompassed by the above description.

All of the various components of the exemplary system diagnostic device 200, as depicted in FIG. 2, may be connected internally, and potentially to a central coordination facility, by one or more data/control busses 290. These data/control busses 290 may provide wired or wireless communication between the various components of the exemplary system diagnostic device 200, whether all of those components are housed integrally in, or are otherwise external and connected to, other components of an overarching access control system with which the exemplary system diagnostic device 200 may be associated.

It should be appreciated that, although depicted in FIG. 2 as an essentially integral unit, the various disclosed elements of the exemplary system diagnostic device 200 may be arranged in any combination of sub-systems as individual components or combinations of components, integral to a single unit, or external to, and in wired or wireless communication with, the single unit of the exemplary system diagnostic device 200. In other words, no specific configuration as an integral unit or as a support unit is to be implied by the depiction in FIG. 2. Further, although depicted as individual units for ease of understanding of the details provided in this disclosure regarding the exemplary system diagnostic device 200, it should be understood that the described functions of any of the individually-depicted components may be undertaken, for example, by one or more processors 220 connected to, and in communication with, one or more data storage device(s) 230, all of which may support operations in the associated access control system.

Figure 3:
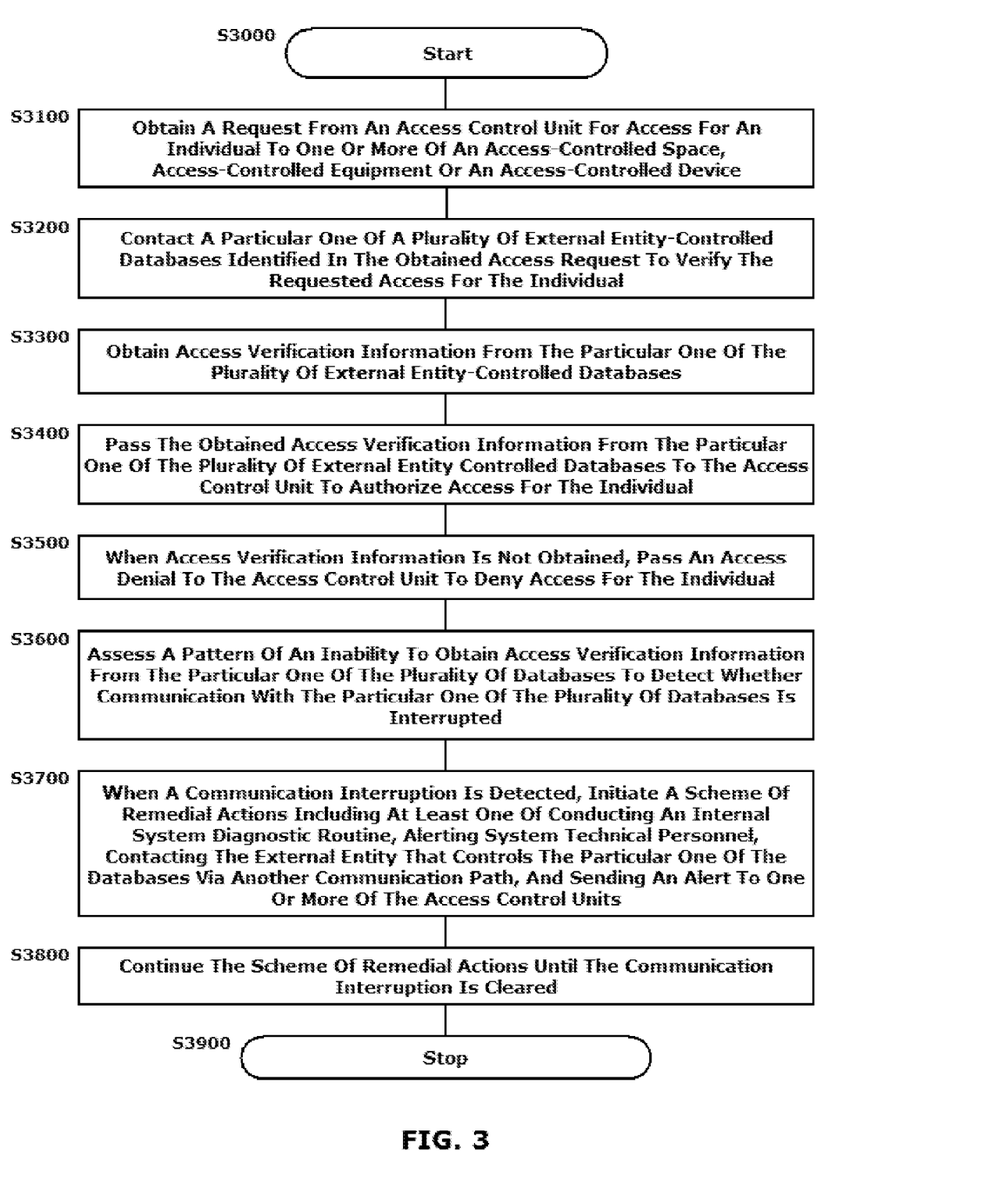
FIG. 3 illustrates a flowchart of an exemplary method for effecting a network connectivity awareness, monitoring and notification scheme according to this disclosure.

The disclosed embodiments may include an exemplary method for effecting a network connectivity awareness, monitoring and notification scheme according to this disclosure. FIG. 3 illustrates an exemplary flowchart of such a method. As shown in FIG. 3, operation of the method commences at Step S3000 and proceeds to Step S3100.

In Step S3100, a request for access for an individual to one or more of an access-controlled space, an access-controlled piece of equipment or an access-control device may be obtained from an access control unit associated with the space, piece of equipment or device. Operation of the method proceeds to Step S3200.

In Step S3200, a particular one of a plurality of external entity-controlled databases identified in the request for access may be contacted to verify authorization for the requested access for the individual. Operation of the method proceeds to Step S3300.

In Step S3300, access verification information may be obtained from the particular one of the plurality of external entity-controlled databases. Operation of the method proceeds to Step S3400.

In Step S3400, in instances where access verification information is obtained from the particular one of the plurality of external entity-controlled databases, the access verification information may be passed to the requesting access control unit to authorize access for the individual to the space, piece of equipment or device. Operation of the method proceeds to Step S3500.

In Step S3500, in instances where access and verification information is not obtained from the particular one of the plurality of external entity-controlled databases, information indicating a denial of access to the space, piece of equipment or device may be passed to the requesting access control unit in order that the individual requesting access to the space, piece of equipment or device remains restricted. Operation of the method proceeds to Step S3600.

In Step S3600, a pattern of an inability to obtain access verification information from this particular one of the plurality of external entity-controlled databases may be analyzed and/or assessed with at least an objective of detecting whether communication with the particular one of the plurality of external entity-controlled databases is interrupted. Operation of the method proceeds to Step S3700.

In Step S3700, in instances when it is determined that a communication interruption is detected with the particular one of the plurality of external entity-controlled databases, a scheme of remedial actions may be initiated. These remedial actions may include, but are not limited to, conducting an internal system diagnostic routine including potentially informing internal technical assistance personnel, contacting the external entity that controls the particular one of the databases by another communication path to ascertain a reason for the communication interruption and/or to quickly re-establish the communication link with a particular external entity-controlled database, and/or sending one or more alert messages to the access control unit via which individual access was requested and other similarly-situated access control units that may benefit from knowing a status of communication with the particular external entity-controlled database. Operation of the method proceeds to Step S3800.

In Step S3800, any individually-initiated remedial actions may continue, and continue to be monitored, until communication with the particular external entity-controlled database is restored, or issues surrounding the communication interruption are resolved to the satisfaction of the external entity controlling the particular database with which communication is interrupted. Operation of the method proceeds to Step S3900, where operation of the method ceases.

The disclosed embodiments may include a non-transitory computer-readable medium storing instructions which, when executed by a processor, may cause the processor to execute all, or at least some, of the functions that may be appropriate to implement the steps of the method outlined above.

The above-described exemplary systems and methods reference certain conventional components to provide a brief, general description of suitable operating environments in which the subject matter of this disclosure may be implemented for familiarity and ease of understanding. Although not required, embodiments of the disclosed systems, and implementations of the disclosed methods, may be provided and executed, at least in part, in a form of hardware circuits, firmware, or software computer-executable instructions to carry out the specific functions described. These may include individual program modules executed by one or more processors. Generally, program modules include routine programs, objects, components, data structures, and the like that perform particular tasks or implement particular data types in support of the overall objective of the systems and methods according to this disclosure.

Those skilled in the art will appreciate that other embodiments of the disclosed subject matter may be practiced in integrating access control techniques using many and widely-varied system components.

As indicated above, embodiments within the scope of this disclosure may also include computer-readable media having stored computer-executable instructions or data structures that can be accessed, read and executed by one or more processors in differing devices, as described. Such computer-readable media can be any available media that can be accessed by a processor, general purpose or special purpose computer. By way of example, and not limitation, such computer-readable media can comprise RAM, ROM, EEPROM, CD-ROM, flash drives, data memory cards, or other analog or digital data storage device that can be used to carry or store desired program elements or steps in the form of accessible computer-executable instructions or data structures. When information is transferred or provided over a network or another communication connection, whether wired, wireless, or in some combination of the two, the receiving processor properly views the connection as a computer-readable medium. Thus, any such connection is properly termed a computer-readable medium. Combinations of the above should also be included within the scope of the computer-readable media for the purposes of this disclosure.

Computer-executable instructions include, for example, non-transitory instructions and data that can be executed and accessed respectively to cause a processor to perform certain of the above-specified functions, individually or in various combinations. Computer-executable instructions may also include program modules that are remotely stored for access and execution by a processor.

The exemplary depicted sequence of executable instructions or associated data structures represent one example of a corresponding sequence of acts for implementing the functions described in the steps of the above-outlined exemplary method. The exemplary depicted steps may be executed in any reasonable order to carry into effect the objectives of the disclosed embodiments. No particular order to the disclosed steps of the method is necessarily implied by the depiction in FIG. 3, except where execution of a particular method step is a necessary precondition to execution of any other method step.

Although the above description may contain specific details, they should not be construed as limiting the claims in any way. Other configurations of the described embodiments of the disclosed systems and methods are part of the scope of this disclosure. It will be appreciated that various of the above-disclosed and other features and functions, or alternatives thereof, may be desirably combined into many other different systems or applications. Although the above description may contain specific details, they should not be construed as limiting the claims in any way. Other configurations are part of the scope of the disclosed embodiments. For example, the principles of the disclosed embodiments may be applied to each individual access unit and each individual external anti-controlled database that may individually reliably employ components of the disclosed system. This enables each access unit and/or database to enjoy the benefits of the disclosed embodiments even if any one of the large number of possible end-user nodes do not need some portion of the described functionality. In other words, there may be multiple instances of the disclosed system each processing the content in various possible ways. It does not necessarily need to be one system used by all end-user nodes. Accordingly, the appended claims and their legal equivalents should only define the disclosed embodiments, rather than any specific examples given.

We claim:

1. A system for implementing access control, comprising:
a first communicating device that communicates with a plurality of access control checkpoint components;
a second communicating device that communicates with a plurality of access control databases;
an access resolution device that
receives an individual access request from one of the plurality of access control checkpoint components via the first communicating device, the individual access request including identifying information for the individual, and identifying information for the one of the plurality of access control databases containing the information for the individual access verification,
queries the one of the plurality of databases containing the information for the individual access verification according to the identifying information in the individual access request via the second communicating device,
forwards access verification information for the individual received in response to the query to the one of the plurality of access control checkpoint components via the first communicating device, and
forwards an access denial for the individual to the one of the plurality of access control checkpoint components via the first communicating device based on a failure to receive access verification information for the individual in response to the query; and a connection assessment device that determines that the failure to receive access verification information for a plurality of individuals in response to a plurality of queries to one of the plurality of access control databases is based on an interruption in communication between the access resolution device and the one of the plurality of access control databases via the second communicating device, and alerts a user to the interruption in communication.

2. The system of claim 1, the connection assessment device assessing that a number of access denials exceeds a pre-determined number to determine that the failure to receive access verification information for the plurality of individuals in response to the plurality of queries to one of the plurality of access control databases is based on the interruption in communication between the access resolution device and the one of the plurality of access control databases via the second communicating device.

3. The system of claim 1, each of the plurality of access control checkpoint components being used by individuals to gain access to at least one of an access-controlled space, an access-controlled piece of equipment and an access-controlled device.

4. The system of claim 1, each of the plurality of access control databases being separately controlled by a respective individual entity and containing information maintained by the respective individual entity for individual access verification.

5. The system of claim 4, each of the plurality of access control databases being an employee database of a company as the respective individual entity.

6. The system of claim 5, at least some of the plurality of access control checkpoint components being communication devices at separate airline employee security checkpoints in an airport, the company being an airline employing individuals gaining access to secure areas in the airport via the separate airline employee security checkpoints.

7. The system of claim 1, further comprising a third communication device that is a different communication device from the second communicating device for contacting the respective individual entity controlling the one of the plurality of access control databases with which communication is interrupted.

8. The system of claim 1, the connection assessment device alerting an individual or another user using at least one of the plurality of access control checkpoint components as to the communication interruption with the one of the plurality of access to databases.

9. The system of claim 1, further comprising a remedial actions device that initiates one or more remedial actions when the connection assessment device determines that the communication interruption with the one of the plurality of access control databases occurred.

10. The system of claim 9, the remedial actions including at least one of alerting a system technical personnel to an occurrence of the communication interruption and executing automated routine to restore the interrupted communications.

11. A method for implementing access control, comprising:

receiving, with a processor, access authorization requests from a plurality of access control checkpoint components, each access authorization request identifying an individual requesting access and identifying information for the one of the plurality of access control databases containing the information for the individual access verification;

forwarding, with the processor, queries to the identified ones of the plurality of access control databases containing the information for the individuals access verification;

forwarding, with the processor, access verification information for the individuals received in response to the queries to the plurality of access control checkpoint components from which the access authorization requests are received;

forwarding, with the processor, access denials for the individuals in response to the queries to the plurality of access control checkpoint components from which the access authorization requests are received on failures to receive access verification information for the individuals in response to the queries;

determining, with the processor, that the failures to receive access verification information for a plurality of individuals in response to a plurality of queries to one of the plurality of access control databases are based on an interruption in communication with the one of the plurality of access control databases; and directing, with the processor, alerts to users regarding the interruption in communication.

12. The method of claim 11, further comprising assessing that a number of access denials exceeds a pre-determined number to determine that the failure to receive access verification information for the plurality of individuals in response to the plurality of queries to one of the plurality of access control databases is based on the interruption in communication with the one of the plurality of access control databases.

13. The method of claim 11, each of the plurality of access control checkpoint components being used by individuals to gain access to at least one of an access-controlled space, an access-controlled piece of equipment and an access-controlled device.

14. The method of claim 11, each of the plurality of access control databases being separately controlled by a respective individual entity and containing information maintained by the respective individual entity for individual access verification.

15. The method of claim 14, each of the plurality of access control databases being an employee database of a company as the respective individual entity.

16. The method of claim 15, at least some of the plurality of access control checkpoint components being communication devices at separate airline employee security checkpoints in an airport, the company being an airline employing individuals gaining access to secure areas in the airport via the separate airline employee security checkpoints.

17. The method of claim 11, further comprising contacting, with the processor, the respective individual entity controlling the one of the plurality of access control databases with which communication is interrupted to determine at least one of a cause for the interrupted communication and actions to restore the interrupted communication.

18. The method of claim 11, the alerting the user comprising alerting an individual or another user using at least one of the plurality of access control checkpoint components as to the communication interruption with the one of the plurality of access to databases.

19. The system of claim 11, further comprising initiating, with the processor, one or more remedial actions when it is determined that the communication interruption with the one of the plurality of access control databases occurred, the one or more remedial actions including at least one of alerting system technical personnel to an occurrence of the communication interruption and executing an automated routine to restore the interrupted communications.

20. A non-transitory data storage medium storing instructions that, when executed by a processor, cause the processor to execute the steps of a method for implementing access control, the method comprising:

receiving access authorization requests from a plurality of access control checkpoint components, each access authorization request identifying an individual requesting access and identifying information for the one of the plurality of access control databases containing the information for the individual access verification;

forwarding queries to the identified ones of the plurality of access control databases containing the information for the individuals access verification;

forwarding access verification information for the individuals received in response to the queries to the plurality of access control checkpoint components from which the access authorization requests are received;

forwarding access denials for the individuals in response to the queries to the plurality of access control checkpoint components from which the access authorization requests are received on failures to receive access verification information for the individuals in response to the queries;

determining that the failures to receive access verification information for a plurality of individuals in response to a plurality of queries to one of the plurality of access control databases are based on an interruption in communication with the one of the plurality of access control databases; and directing alerts to users regarding the interruption in communication.

* * * * *